US012013668B2

(12) United States Patent
Imboden et al.

(10) Patent No.: US 12,013,668 B2
(45) Date of Patent: Jun. 18, 2024

(54) TIMEPIECE INCORPORATING AN ACTUATOR COMPRISING AN ELECTROMECHANICAL DEVICE

(71) Applicant: The Swatch Group Research and Development Ltd, Marin (CH)

(72) Inventors: Matthias Imboden, St-Blaise (CH); Jean-Pierre Mignot, Pontarlier (FR)

(73) Assignee: The Swatch Group Research and Development Ltd, Marin (CH)

( * ) Notice: Subject to any disclaimer, the term of this patent is extended or adjusted under 35 U.S.C. 154(b) by 185 days.

(21) Appl. No.: 17/673,146

(22) Filed: Feb. 16, 2022

(65) Prior Publication Data

US 2022/0308527 A1 Sep. 29, 2022

(30) Foreign Application Priority Data

Mar. 23, 2021 (EP) .................................... 21164369
Oct. 29, 2021 (EP) .................................... 21205508

(51) Int. Cl.
*G04C 3/04* (2006.01)
*G04C 3/06* (2006.01)
*G04C 11/08* (2006.01)

(52) U.S. Cl.
CPC ............. *G04C 3/045* (2013.01); *G04C 3/047* (2013.01); *G04C 3/066* (2013.01); *G04C 11/084* (2013.01)

(58) Field of Classification Search
CPC ...................................................... G04C 3/047
See application file for complete search history.

(56) References Cited

U.S. PATENT DOCUMENTS

2020/0026240 A1* 1/2020 Tombez ................. G04B 15/14

FOREIGN PATENT DOCUMENTS

CH 715 399 A2 3/2020
WO 2018/177779 A1 10/2018

OTHER PUBLICATIONS

European Search Report for 21 16 4369 dated, Aug. 16, 2021.

* cited by examiner

*Primary Examiner* — Renee S Luebke
*Assistant Examiner* — Matthew Hwang
(74) *Attorney, Agent, or Firm* — Sughrue Mion, PLLC

(57) ABSTRACT

A timepiece (2) includes an actuator, which applies braking pulses to the balance, which has an electromechanical device (6) and an electric control circuit (8). The device (6) includes a flexible member (16), formed by an elastic blade (20) and a mechanical element (22) defining a braking pad, and an electromagnetic system (10) formed by a coil carried by the flexible member and by a permanent magnet rigidly connected to a support (18) of the electromechanical device. When an electric pulse is provided to the coil, an electromagnetic force of repulsion is engendered between the coil and the permanent magnet so the mechanical element moves to a position of contact with the balance. To stabilise the rest position of the flexible member, a magnetic element (26) is rigidly connected to the coil to exert a magnetic return force complementary to the force of the elastic blade is provided.

16 Claims, 8 Drawing Sheets

TIMEPIECE INCORPORATING AN ACTUATOR COMPRISING AN ELECTROMECHANICAL DEVICE

CROSS-REFERENCE TO RELATED APPLICATIONS

This application claims priority to European Patent Application No. 21164369.7 filed Mar. 23, 2021 and European Patent Application No. 21205508.1 filed Oct. 29, 2021, the entire contents of which are incorporated herein by reference.

TECHNICAL FIELD OF THE INVENTION

The present invention relates to a timepiece incorporating an actuator formed by an electromechanical device that comprises an electromagnetic system formed by a permanent magnet and a coil. The electromechanical device comprises a mechanical element that can undergo a movement between a rest position and a position of contact with a predetermined part of the timepiece when the electromagnetic system is activated by an electric control circuit.

The actuator according to the invention can in particular be used to carry out mechanical braking pulses that are applied to a mechanical resonator, in particular to the balance of a balance-spring forming such a mechanical resonator, to regulate its average frequency or correct a temporal drift detected in the running of the timepiece.

Technological Background

An actuator of the type given above is for example described in the patent application WO 2018/177779 in relation to FIG. 4. The actuator comprises a flexible blade that is actuated by a coil-magnet electromagnetic system. One problem with such an actuator comes from the fact that in the absence of power supply to the coil, the flexible blade can easily undergo undesired movements from the rest position provided in the case of impacts or even relatively small accelerations engendered by movements of the forearm of a carrier of the timepiece incorporating the actuator. These movements can engender parasite braking pulses which are applied to the balance-spring and which thus disturb its operation and in particular the regulation provided of its average frequency. The flexible blade can even oscillate after an impact or a sudden movement of the user of the timepiece and engender a series of parasite braking pulses.

Indeed, even though the flexible blade is mechanically returned towards a rest position in the absence of activation of the electromagnetic system, as is provided between the generation on command of the braking pulses (the activation of the electromagnetic system being provided only during the generation of the braking pulses to limit the electricity consumption of the actuator), this mechanical return force is weak near the rest position. In a known manner, the elastic force increases linearly with the distance of the flexible blade from its rest position. Thus, this flexible blade easily vibrates and can easily present undesired movements, the amplitude of which is sufficient for the flexible blade to touch the balance.

SUMMARY OF THE INVENTION

The goal of the present invention is to overcome the technical problem brought to light in the technological background by providing a timepiece incorporating an actuator, for which the rest position of a flexible member, actuated by an electromagnetic system, is more stable to prevent or at least reduce, in the case that the timepiece is subjected to accelerations when it is carried on the wrist of a user, the risk of undesired movements of this flexible member with an amplitude such that the actuator can engender a parasite pulse on a determined part of the timepiece, in particular on the balance of a mechanical resonator.

To achieve the aforementioned goal, the invention relates to a timepiece incorporating an actuator formed by an electromechanical device, comprising an electromagnetic system and a mechanical element that is mobile in translation and associated with the electromagnetic system, and by an electric control circuit. The electromagnetic system is formed by a permanent magnet and a coil, one out of the two of which is carried by a flexible member of the electromechanical device and the other by a support of this flexible member. The mechanical element is part of the flexible member and the actuator is arranged in such a way as to allow, in response to an electric activation signal generated by the electric control circuit and provided to the coil to engender an electromagnetic force between this coil and the permanent magnet, a movement of the mechanical element from a rest position, in which it is provided that the mechanical element remains in the absence of an activation of the electromagnetic system, to a position of contact with a determined part of the timepiece. Then, the flexible member is formed at least partially by an elastic element that is arranged in such a way as to engender a mechanical force of return of the mechanical element in the direction of the rest position over at least a majority of the distance that the mechanical element can travel, when the electric control circuit generates said electric activation signal, between the rest position and the contact position, this contact position ending said at least a majority of said distance. Moreover, the actuator further comprises a magnetic element that is arranged in such a way as to be able to interact with the permanent magnet to engender between them a magnetic force that is exerted on the mechanical element when the latter is in the rest position, this magnetic force having a direction opposite to that of the electromagnetic force over at least an initial part of said distance from the rest position and an intensity that decreases, over said at least an initial part, when the mechanical element moves away from the rest position, this intensity being less than the intensity that the electromagnetic force has for any position of the mechanical element in said at least an initial part.

Via the arrangement of an additional magnetic element in the actuator according to the invention, the rest position of the flexible member is made more stable, so that the mechanical element mobile in translation remains in general in this rest position in the absence of an electric activation signal provided to the coil. Thus, the risk of contact between the magnetic element and the determined part of the timepiece, in the absence of an electric activation signal, is greatly reduced. In particular, said determined part is a balance forming a mechanical oscillator of a mechanical mechanism that the timepiece comprises.

BRIEF DESCRIPTION OF THE DRAWINGS

The invention will be described below in a detailed manner using the appended drawings, given as examples that are in no way limiting, in which.

DETAILED DESCRIPTION OF THE INVENTION

Figure 1:
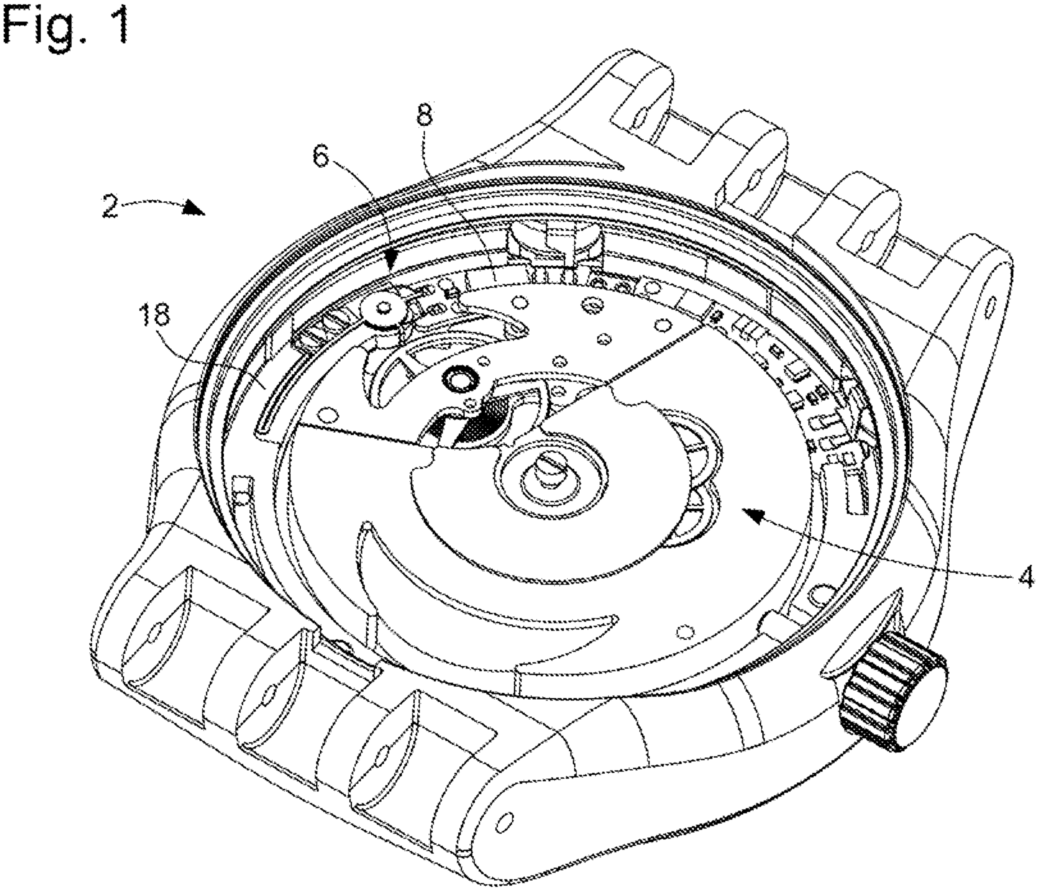
FIG. 1 is a perspective view, with the bottom open and the oscillating mass removed, of a first alternative of a first embodiment of a watch according to the invention.
Figure 2:
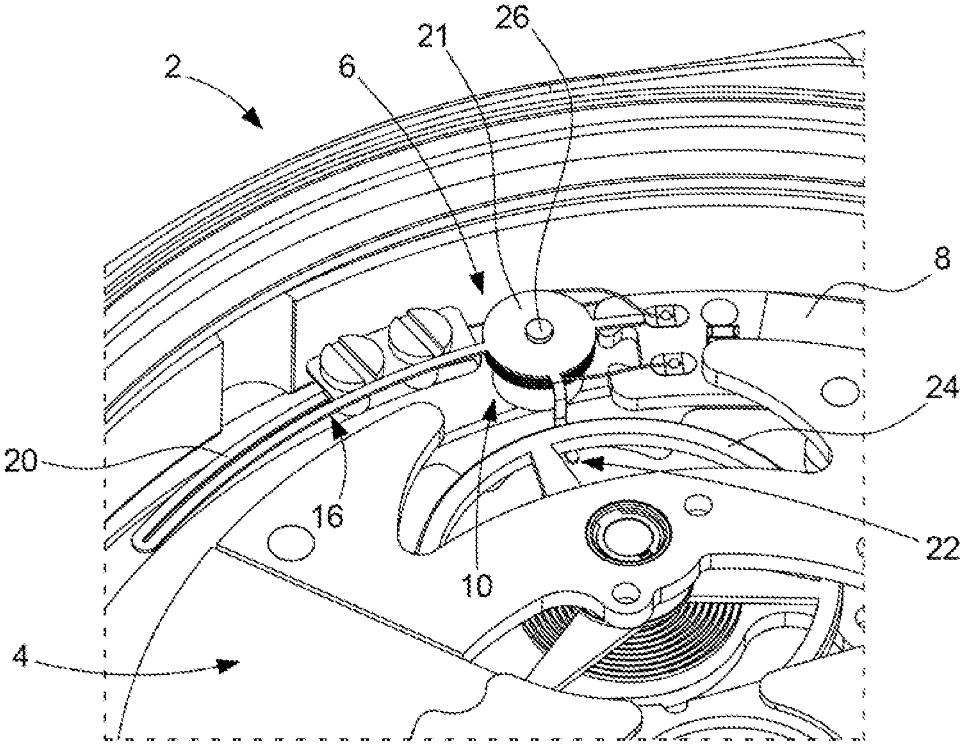
FIG. 2 is a partial enlargement of FIG. 1.

In reference to FIGS. 1 to 6, a first embodiment of a timepiece according to the invention will be described below.

A first alternative is shown in FIGS. 1 to 3B. The watch 2, shown in FIGS. 1 and 2 without the bottom of the case and without the oscillating mass of the mechanical movement 4, incorporates an actuator formed by an electromechanical device 6 and an electric control circuit 8. The electromechanical device comprises an electromagnetic system 10 and a mechanical element 22 that is mobile in translation, according to an axis Z, and associated with the electromagnetic system. The electromagnetic system 10 is formed by a permanent magnet 12 and a coil 14, the latter being carried by a flexible member 16, forming the electromechanical device, while the permanent magnet is carried by a support 18 of this flexible member. It is noted that in FIG. 2, the part of the support to which the flexible member 16 is fastened, via two screws, has been removed to make the permanent magnet visible.

The flexible member 16 is formed at least partly by an elastic element 20. This flexible member comprises the mechanical element 22 that can be part of this elastic element or be fastened to the latter. The elastic element 20 is arranged in such a way as to engender a mechanical force of return of the mechanical element 22 in the direction of a rest position of the flexible member over at least a majority of the distance that this mechanical element can travel according to the axis Z, when the electric control circuit generates an electric activation signal, between its rest position, defined by the position Z=0.0 in FIG. 3A, and the position of contact with the felloe 24 of a balance of the mechanical resonator of the mechanical movement 4, this contact position ending said at least a majority of said distance. The contact position corresponds substantially to a distance Z=0.5 mm for the mechanical element 22. In the alternative shown, the elastic element is advantageously formed by an elastic blade 20 which is folded onto itself in such a way as to increase its length for a given bulk of the electromechanical device 6.

Figure 3A:
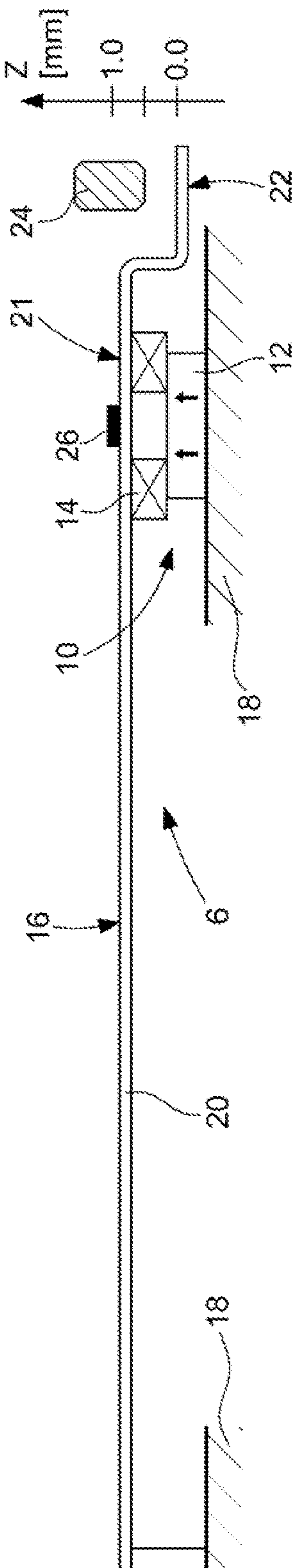
FIGS. 3A and 3B are linear representations of the electromechanical device of the actuator incorporated into the watch of FIG. 1, respectively in a rest position of the flexible member of this electromechanical device and in a position of contact with the balance of the watch.
Figure 3B:
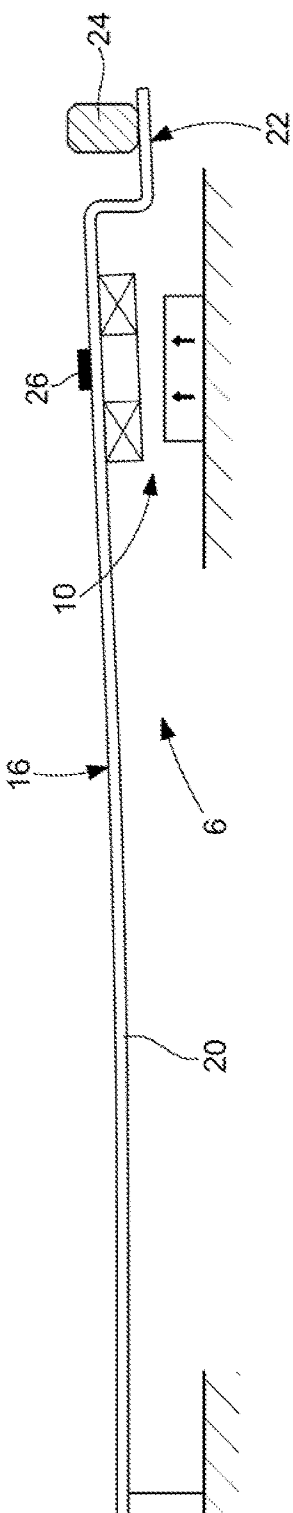

The flexible member is formed by a base fastened onto the support 18, the elastic blade 20, a flat disc 21 at the free end of the elastic blade and the mechanical element 22 which is formed in one piece with the flat disc and which is connected to the latter via an elbow part. It is noted that the mechanical element 22 forms a sort of pad allowing to apply to the felloe 24 mechanical braking pulses by contact between this pad and the bottom of this felloe. To do this, the mechanical element 22 must be able to exert a certain force on an inner surface of the felloe 24, which the actuator described here allows. The mechanical element 22 is thus part of the flexible member 16 even though it is not itself necessarily flexible, but it is connected to the free end of the elastic element 20, directly or by another part of the flexible member, in such a way that it can undergo a movement when the elastic element is subjected to a deformation force engendered by the electromagnetic system 10, as shown in FIG. 3B.

The actuator is arranged in such a way as to allow, in response to an electric activation signal generated by the electric control circuit 8 generally in the form of electric pulses and provided to the coil 14 to engender an electromagnetic force of repulsion between this coil and the permanent magnet 12, a movement of the mechanical element 22 from the rest position (Z=0.0), in which it is provided that the mechanical element remains in the absence of an activation of the electromagnetic system 10, to the position of contact (Z=0.5 mm) with the felloe 24 of the balance, and more generally with a determined part of the timepiece according to the use provided for the actuator. It is noted that, in an alternative embodiment in which the axial positions of the mechanical element and of the felloe of the balance are inverted and in which the electromagnetic system has, when this electromagnetic system is inactive and thus at rest, a free space between the permanent magnet and the coil, the electromagnetic force is thus provided as attractive to actuate the mechanical element from its rest position to its contact position.

According to the invention, the actuator further comprises a magnetic element arranged in a fixed position relative to the axis of rotation of the balance of the mechanical resonator and arranged in such a way as to be able to interact with the permanent magnet 12 to engender between them a magnetic force which is exerted on the mechanical element 22 when the latter is in its rest position and which defines a force of return of this mechanical element towards its rest position over at least an initial part of the distance from the rest position to the contact position. In the specific case in which the actuator is provided in two distinct parts, one of which incorporating the coil is removable, the magnetic element has a stable position relative to the coil when the actuator is in a functional configuration allowing to actuate it. In the specific alternatives shown, the magnetic element 26 is rigidly connected to the coil 14.

The magnetic force has a direction opposite to that of the electromagnetic force, which is engendered in the electromagnetic system 10 during a supply of power to the coil 14, over at least an initial part of the distance from the rest position to the contact position. Then, the magnetic force has an intensity which decreases, over said at least an initial part, when the mechanical element 22 moves away from the rest position and which is less than the intensity that the electromagnetic force of repulsion has for any position of the mechanical element in said at least an initial part. The magnetic element 26 is aligned on the central axis of the permanent magnet 12 when the mechanical element 22 is in the rest position, as shown in FIG. 3A. In the first alternative of the first embodiment described here, the magnetic element is formed by an element 26 consisting of a ferromagnetic material, hereinafter called ferromagnetic element.

In the first embodiment described here, the permanent magnet 12 has the shape of a disc, more generally a solid, flat, round shape. Likewise, the magnetic element 26 has the shape of a disc, generally a solid, flat, round shape.

In the absence of activation of the electromagnetic system, the magnetic force provided is very effective for stabilising the flexible member 16 and thus the mechanical element 22 in the rest position. The magnetic element 26 is arranged in such a way that it exerts a force with an increasing intensity when the mechanical element moves closer to the rest position, contrary to the elastic force of the flexible member. Thus, without electric power supply, the flexible member is subjected to a magnetic force that tends to maintain it in its rest position and to return it strongly towards the latter in the case of an outside disturbance that may momentarily move it away from the rest position, by limiting the moving away of the mechanical element 22 and also the amplitude of possible rebounds that the flexible member can have after such a moving away. Indeed, the magnetic force is relatively significant when the mechanical element 22 is in the rest position and near the latter. This will be seen even more precisely in the description of a second alternative below.

Figure 4A:
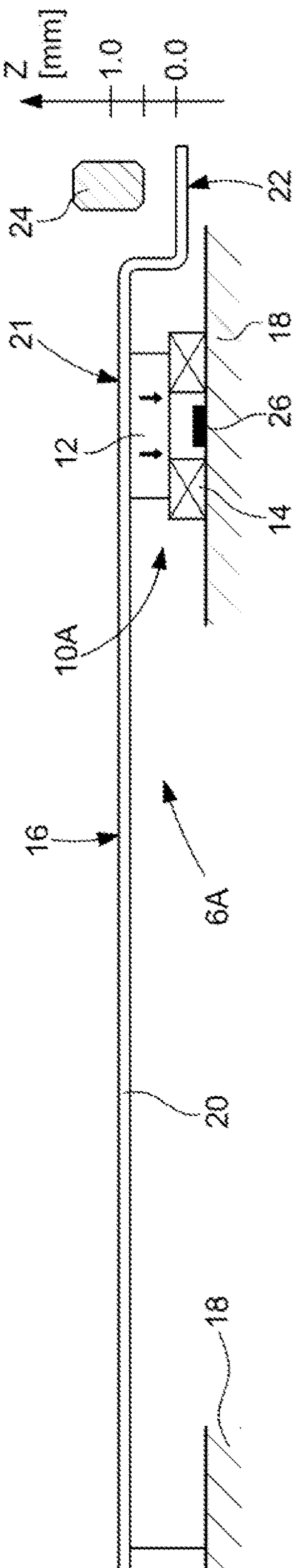
FIGS. 4A and 4B are linear representations, similar to those of FIGS. 3A and 3B, of a second alternative of the electromechanical device according to the first embodiment.
Figure 4B:
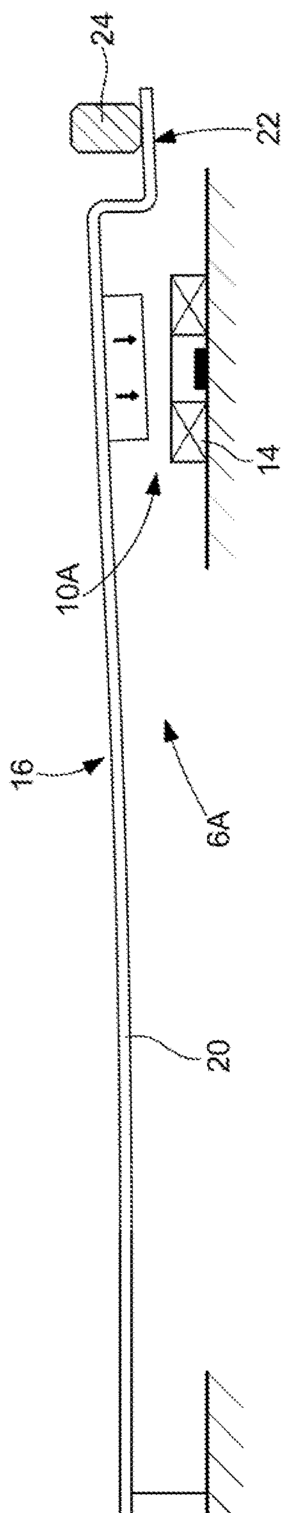

FIGS. 4A and 4B show a second alternative of the first embodiment. This alternative differs from the first alternative by a spatial inversion of the electromagnetic system 10A of the electromechanical device 6A. Thus, the permanent magnet 12 is carried by the elastic blade 20 on its free-end side while the coil 14 is fastened onto the support 18 with the magnetic element 26 arranged in the inner space of the coil. One advantage of this second alternative lies in the fact that the coil undergoes neither movement nor impact against the felloe 24 of the balance when the electromagnetic system 10A is activated. This allows to not stress the electric connections of the coil to the electric control circuit, and thus to avoid a rupture of these connections. However, this second alternative is more sensitive to the outside magnetic fields than the first alternative since the permanent magnet is carried by a mobile part of the flexible member.

The dimensions of the magnetic element are smaller than those of the permanent magnet 12. For example, the coil has an outer diameter equal to 2.4 mm, an inner diameter of 0.9 mm and a height of 0.4 mm. The permanent magnet 12 has a diameter of 2.0 mm and a height of 1.0 mm. The ferromagnetic element 26 has a diameter of 0.15 mm and a thickness of 0.05 mm. It is noted that these values can be optimised according to the type of magnet selected, the distance between the permanent magnet and the ferromagnetic element, the electric pulses that the electric control circuit provides to the electromagnetic system, the desired dynamics for the magnetic element 22 and yet other parameters. It is important to find a size of the magnetic element 26 and a positioning of the latter relative to the permanent magnet to obtain a force of attraction that is rather strong to stabilise the flexible member well, in particular its mechanical element, in the rest position in the absence of activation of the electromagnetic system, while ensuring that the electromagnetic force is sufficient to overcome the magnetic force and to allow a movement of the mechanical element such that the latter can exert a force of a certain intensity on the felloe of the balance against which it must be able to momentarily exert a pressure sufficient to carry out a braking pulse in a use of regulation of the running of the watch.

Figure 5A:
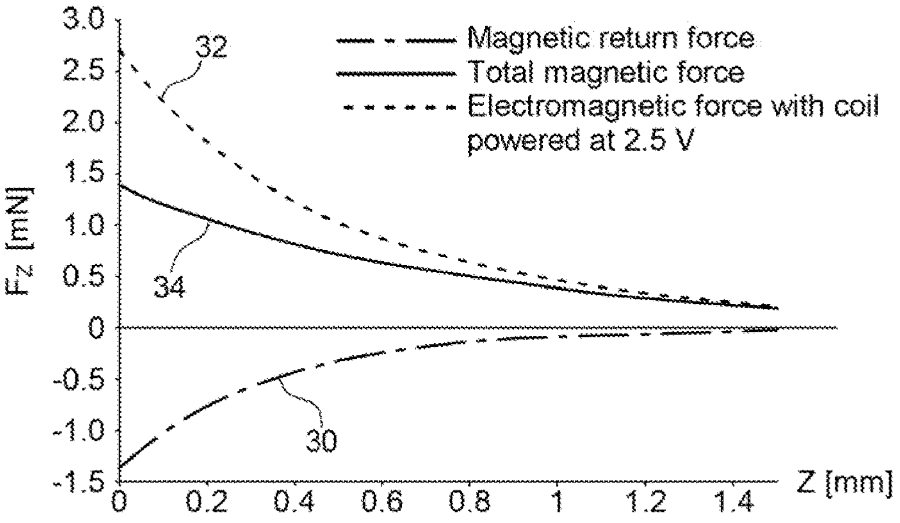
FIGS. 5A and 5B show curves of force according to a movement of the mechanical element, according to an axis Z, for various forces acting in the electromechanical device of the second alternative, shown in FIGS. 4A and 4B.

For the second alternative described here, with dimensions for the electromagnetic system and the ferromagnetic element approximately equal to those given as an example above, FIG. 5A gives a) the curve 30 of the magnetic force engendered between the permanent magnet 12 and the ferromagnetic element 26 according to a movement of the mechanical element according to the axis Z, this force defining a magnetic return force over the entire range of movement shown and in particular over the distance that the mechanical element 22 can travel between the rest position (Z=0.0 mm) and the contact position (Z=0.5 mm); b) the curve 32 of the electromagnetic force, with the coil 14 powered under a voltage of 2.5V, according to the movement of the mechanical element according to the axis Z; c) the curve 34 of the total magnetic force, resulting from the addition of the electromagnetic force and the magnetic return force, according to the movement of the mechanical element according to the axis Z.

Figure 5B:
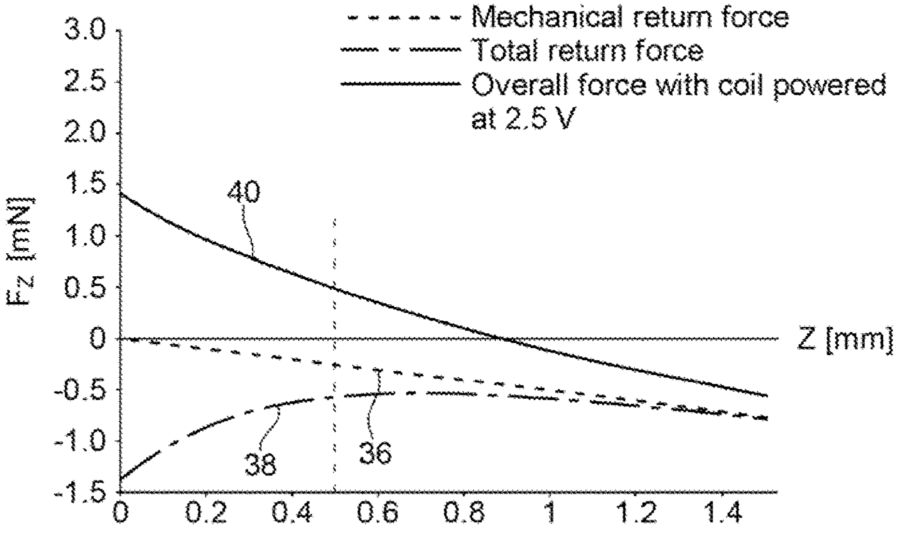

FIG. 5B introduces the mechanical return force, defined by the force exerted by the elastic blade 20 when it moves away from its rest position, which is given by the curve 36, which is determined by the coefficient of elasticity of the elastic blade. Then, the curve 38 represents the total return force, resulting from the addition of the magnetic force (curve 30) and the mechanical return force (curve 36), according to the movement of the mechanical element according to the axis Z. It is observed that the total return force increases in intensity from the contact position to the rest position at which it is maximum, via the ferromagnetic element. Finally, the curve 40 gives the overall force that is exerted on the flexible member 16, at the mechanical element 22, according to the movement of the mechanical element according to the axis Z. Even though this overall force changes mathematical sign and thus direction over the range of movement shown, it still remains positive over the entire distance between the rest position and the contact position provided.

Figure 6:
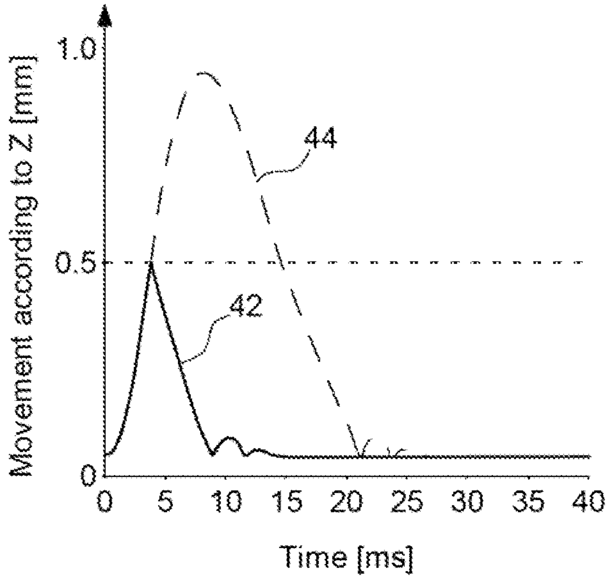
FIG. 6 gives a curve showing the dynamics of the mechanical element during a braking pulse applied to the balance of the watch.

The graphs given in FIG. 5B relate to the particular case in which the elastic element 20 is entirely relaxed when the flexible member is in the rest position (Z=0.0), so that the mechanical force in this position is null. In other alternatives, a prestress of the elastic element is provided in the rest position. Such a prestress can be provided either as positive, so that the mechanical return force (elastic force) is driving over an initial part of the distance from the rest position to the contact position, or negative so that the mechanical return force is greater than that acting in the alternative shown over all of said distance. A prestress of the flexible member at rest thus allows to adjust the total return force, in particular for the rest position and near the latter, and thus the quantity of energy to be provided to the flexible member via the electromagnetic system during a braking pulse. It is understood that this adjustment allows to determine the dynamics of the mechanical element when it is actuated via an electric pulse provided by the electric control circuit to the coil 14. FIG. 6 gives the movement according to the axis Z of the mechanical element 22 during an electric pulse of approximately 4 ms activating the electromagnetic system. The curve 42 shows the real case with the element 22 that is stopped against the felloe 24 of the balance to provide it with a braking pulse, while the curve 44 shows the corresponding virtual case in the absence of the balance. The duration of each electric pulse can be determined according to the desired intensity of the impact between the mechanical element 22 and the felloe 24 of the balance. Moreover, this duration can be provided as greater than the time of movement of the mechanical element between the rest position and the contact position to prolong the duration of the contact between the mechanical element 22 and the felloe 24.

In two other alternatives of the first embodiment, the ferromagnetic element in the two alternatives described above is replaced by a second permanent magnet having a magnetic axis parallel to that of the permanent magnet 12 and the same polarity as this magnet. Thus the first magnet 12 and the second magnet for the stabilisation of the flexible member in the rest position are in magnetic attraction for any position of the mechanical element between the rest position, inclusive, and the contact position. Preferably, the second permanent magnet has a solid, flat, round shape, in particular the shape of a disc.

Figure 7:
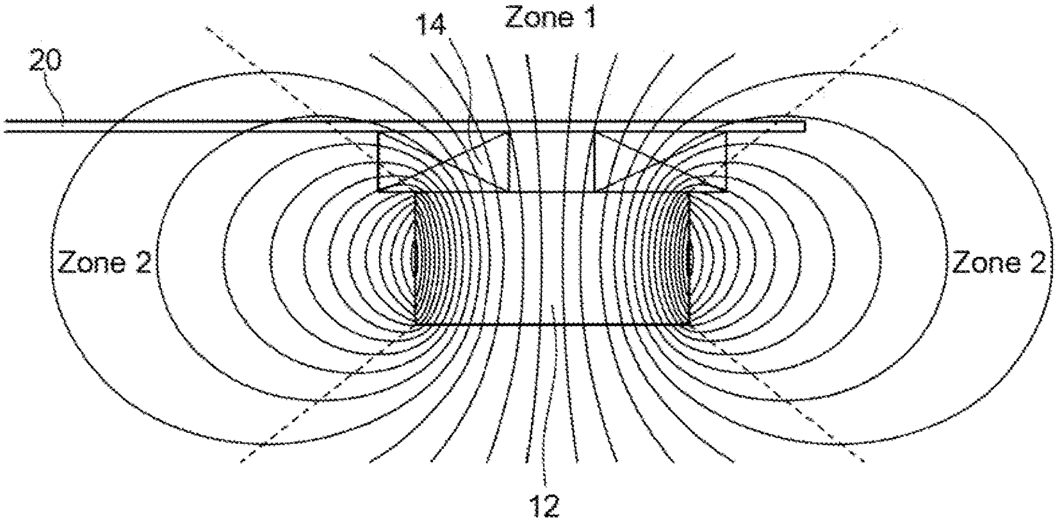
FIG. 7 shows lines of the magnetic field of a permanent magnet in the shape of a solid disc forming the electromagnetic system of the first embodiment.

FIG. 7 is an introduction to the second embodiment which will be described below. This drawing shows the electromagnetic system 10 described above. The magnetic field lines generated by the permanent magnet 12 are shown, these magnetic field lines defining two zones, Zone 1 and Zone 2, for a second magnet placed at the periphery of the magnet 12 and having a magnetic axis with the same direction. If the two magnets have the same polarity according to said direction (axis Z), then they have a magnetic attraction in Zone 1 and a magnetic repulsion in Zone 2. This observation is at the foundation of the second embodiment shown in FIGS. 8A to 8C.

Figure 8A:
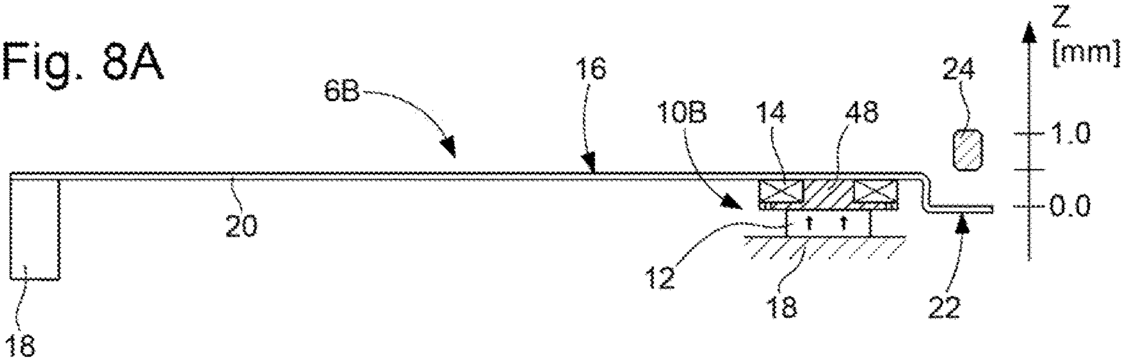
FIGS. 8A and 8B are linear representations, similar to those of FIGS. 3A and 3B, of a second embodiment of the electromechanical device of a watch according to the invention.
Figure 8B:
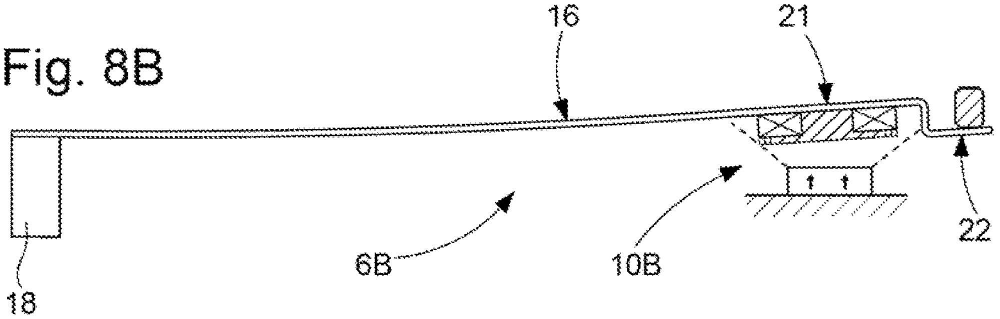
Figure 8C:
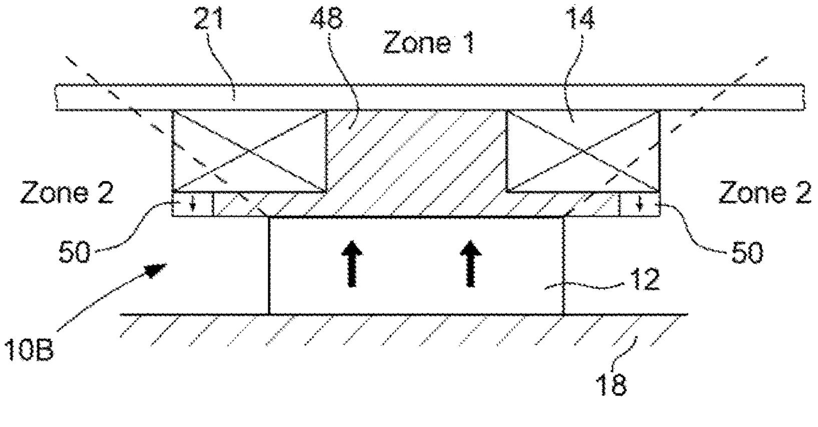
FIG. 8C is a partial enlargement of FIG. 8A.

In reference to FIGS. 8A to 8C, an alternative of a second embodiment is proposed in which the magnetic element for stabilisation of the rest position of the flexible member 16 is a second permanent magnet 50 that has an annular shape defining a central circle. For a rectangular transverse cross-section as shown in the drawings, the diameter of this central circle is conventionally given by the intersection of the two diagonals of this transverse cross-section. The references identical to those of the first embodiment relate to elements or parts that are alike or similar to the corresponding elements or parts of this first embodiment.

This second embodiment differs from the previous one substantially by the fact that the magnetic element of the electromechanical device 6B is a second permanent magnet, which has an annular shape defining a central circle, or by the fact that this magnetic element consists of a plurality of permanent magnets arranged along a geometric circle. The central circle has a diameter that is greater than the outer diameter of the first permanent magnet and it is, when the flexible member is in the rest position (FIGS. 8A and 8C), centred on the central axis of the first permanent magnet 12. The diameter of the central circle is selected so that the magnetic force between the first permanent magnet 12 and the second annular permanent magnet 50 has an inversion of direction during a movement of the mechanical element 22 from the rest position to the position of contact with the balance 24. As visible in FIGS. 8C and 8B, the annular permanent magnet 50 is located in Zone 2 when the flexible member is at rest, so that the magnetic force between the two magnets is in attraction, while in the contact position, the annular permanent magnet is in Zone 1 so that the two magnets are thus in magnetic repulsion.

Thus, in the rest position, the annular permanent magnet 50 indeed plays its role of return towards the rest position. However, during an activation of the electromagnetic system, this annular magnet crosses the border between Zone 2 and Zone 1 and thus the magnetic force becomes positive and consequently a driving force, which modifies the dynamics of the movement of the mechanical element 22 relative to the first embodiment. It is noted that the position according to the axis Z of the annular magnet 50 can easily be adjusted. It is in particular possible for the central circle to be at the upper surface of the first magnet 12, or even below. A part 48 made of non-magnetic material forms a core of the coil 14 and a flange that is surrounded by the magnet 50. This part 48 is subjected to the impact between the flexible member 16 and the magnet 12. Its material can thus be selected to preserve the first magnet, this material preferably having a good capacity for absorption of energy during the impact between the part 48 and the first magnet during a return of the mechanical element towards the rest position after it has been stopped against the felloe 24 of the balance during a braking pulse.

In an alternative not shown, the annular magnet 50 is replaced by a plurality of distinct permanent magnets that are arranged along a geometric circle. In this case, it is the geometric circle which has a diameter greater than the outer diameter of the first permanent magnet 12 and which is, when the flexible member is in the rest position, centred on the central axis of the first permanent magnet. The diameter of the geometric circle is selected so that the magnetic force between the first permanent magnet and the plurality of permanent magnets has an inversion of direction during the movement of the mechanical element between the rest position and the contact position. This alternative has the advantage of not having to produce an annular magnet having a small transverse cross-section. In a first case, the plurality of magnets can consist of two small magnets arranged in a diametrically opposite manner and oriented preferably orthogonally to the direction of the terminal part of the elastic blade 20 connected to the disc 21 supporting the coil and the part 48. In a second case, four magnets distributed regularly along the geometric circle are provided. These magnets can be housed in cavities of the flange of the part for contact with the first magnet.

Figure 9A:
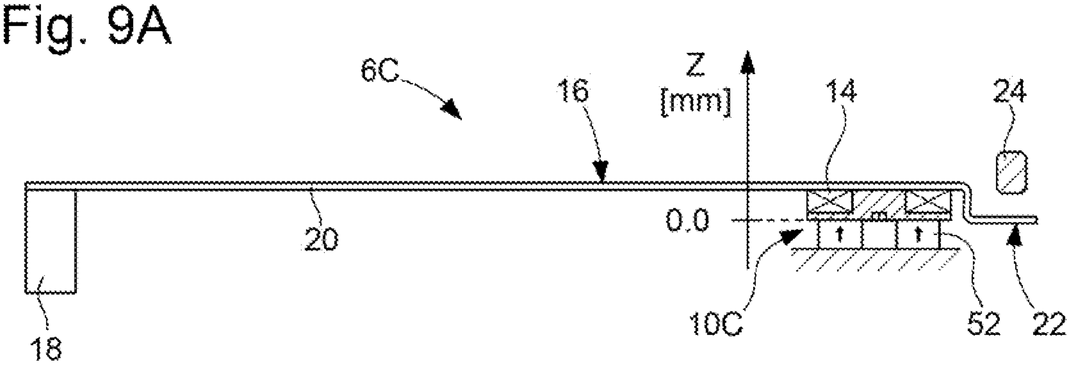
FIGS. 9A, 9B and 9C relate to a third embodiment of a watch according to the invention and are representations similar to those of FIGS. 8A to 8C.
Figure 9B:
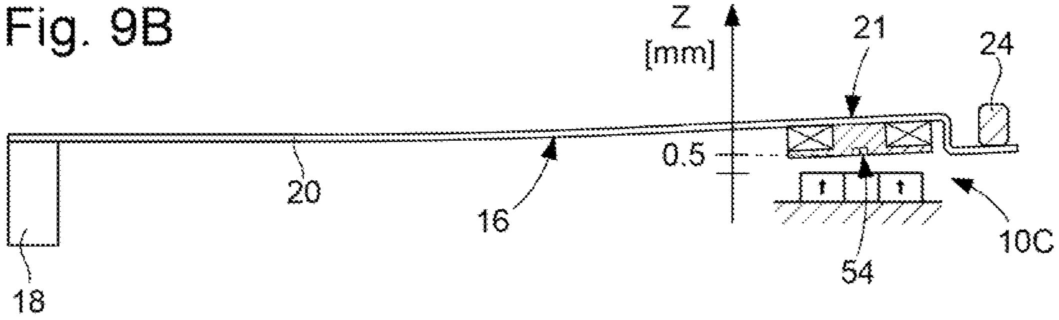
Figure 9C:
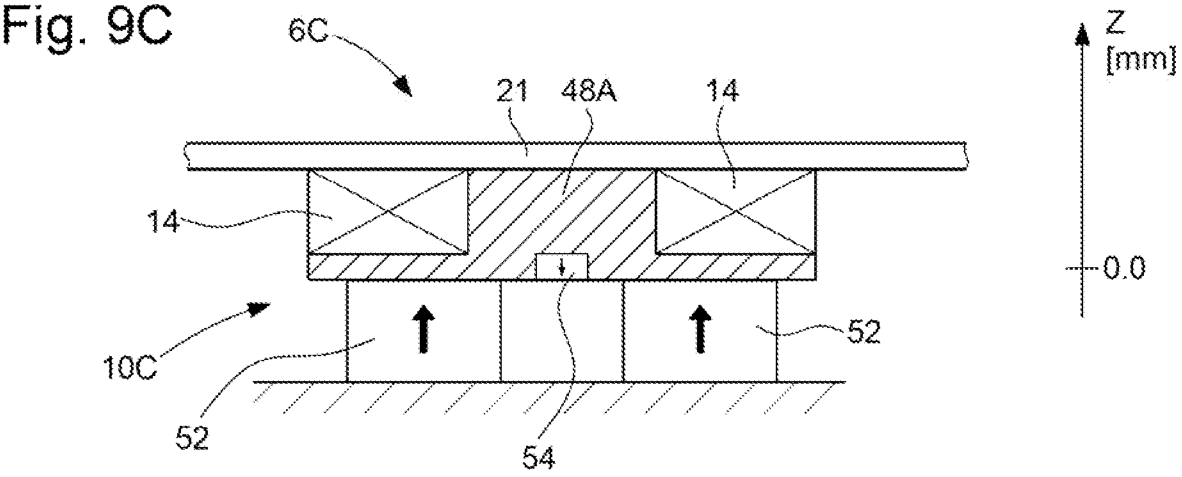

In reference to FIGS. 9A to 11B, a third embodiment of the invention will be described below. The references already described above will not be described again in detail here. This third embodiment is characterised by an electromagnetic system 10C, the permanent magnet 52 of which, called first permanent magnet or first magnet, has an annular shape, and by a magnetic element consisting of a permanent magnet 54, called second permanent magnet or second magnet, having a solid, flat, round shape, in particular the shape of a disc. The second magnet is arranged in such a way as to be aligned on a central axis of the first magnet when the mechanical element 22 is in the rest position (FIGS. 9A and 9C). This second magnet is placed in a housing of a support 48A forming a core for the coil 14 and moreover a flange that covers the lower surface of this coil, like in the second embodiment. The position zero according to the axis Z is defined by the upper surface of the first magnet and the rest position of the flexible member 16 corresponds to a positioning of the second magnet, which is mobile in a synchronous manner with the mechanical element 22, in which its lower surface is substantially at the position zero. FIG. 9B shows the electromechanical device 6C of the actuator considered in a situation/a state in which the flexible member, in particular its mechanical element, is in the position of contact with the balance.

Figure 10A:
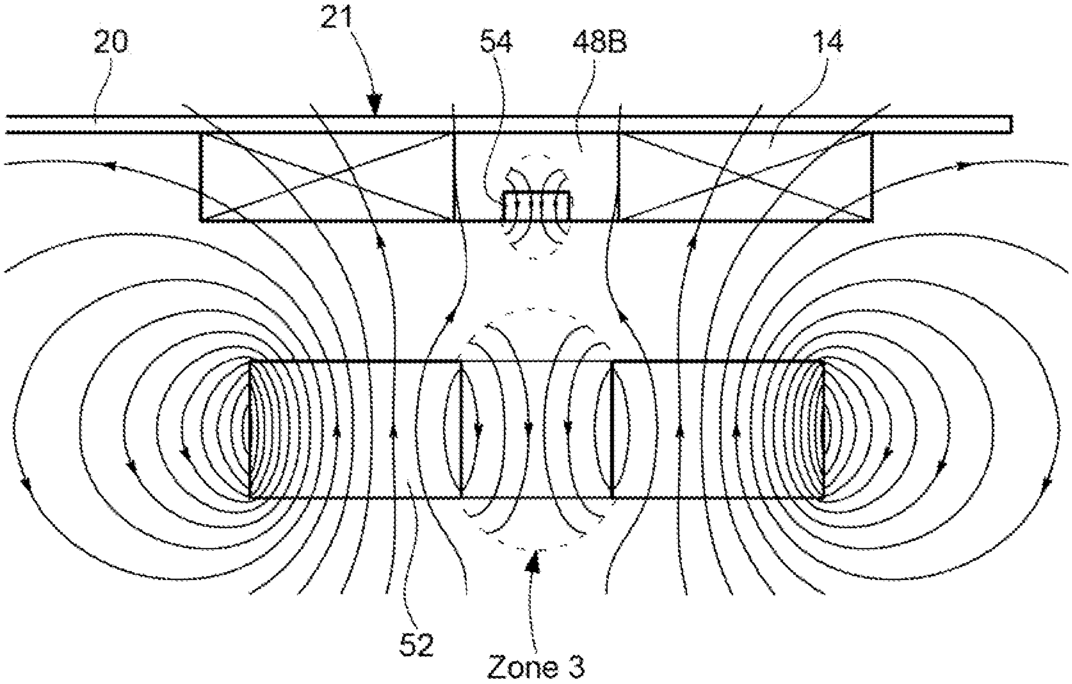
FIGS. 10A and 10B are partial representations of the electromechanical device of the third embodiment respectively for two different positions of the mechanical element formed by this electromechanical device.
Figure 10B:
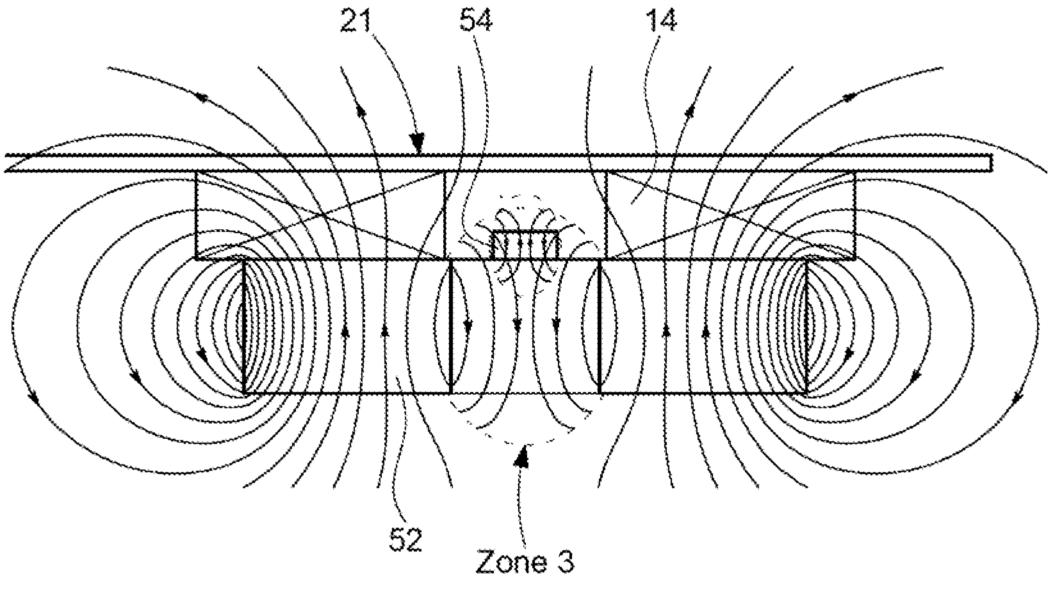

Then, the second magnet 54 is arranged so that the magnetic force between the first annular magnet 52 and this second magnet has an inversion of direction during a movement of the mechanical element 22 from its rest position to the position of contact with the felloe 24 of the balance, in response to an electric pulse provided to the coil 14 by the electric control circuit to engender a braking pulse. FIGS. 10A and 10B partially show a second alternative embodiment that has an arrangement of the first and second magnets that is similar to that of the first alternative given in FIGS. 9A to 9C. Thus the interaction between these two magnets is identical in the two alternatives. The only difference lies in the fact that the support 48B of the second magnet in the second alternative only forms a non-magnetic core for the coil 14 whereas the support 48A of the first alternative further has a flange covering the lower surface of the coil. In FIGS. 10A and 10B, the magnetic field lines of the first annular magnet and of the second magnet are partially shown. The inner space of the first magnet 52 defines a central void having a cylindrical shape. The annular shape of the first magnet has the particularity that its magnetic field lines inside of the cylindrical central void have a direction opposite to that of the magnetic field in the magnet itself. Thus, in a Zone 3 encompassing the inner space and two complementary zones extending respectively on either side of this inner space, the direction of the magnetic field generated by the first magnet is opposite, according to the axis Z, to the direction of the magnetic field of this first magnet in a zone extending the Zone 3 above said inner space.

FIG. 10A partially shows the electromechanical device 6C, in particular the disc 21 of the flexible member 16, the electromagnetic system 100 and the additional magnetic element 54, in a situation corresponding to that of FIG. 9B in which the flexible member, in particular its mechanical element, is in the contact position. In this state, the second magnet, which has a polarity opposite to that of the first annular magnet (that is to say between the lower surface and the upper surface of this first magnet), undergoes a magnetic repulsion. FIG. 10B partially shows the electromechanical device 6C in a situation corresponding to that of FIGS. 9A and 9C in which the flexible member is in its rest position. In this state, the second magnet 54 is located in Zone 3 and it thus undergoes a magnetic attraction on the part of the first annular magnet.

Figure 11A:
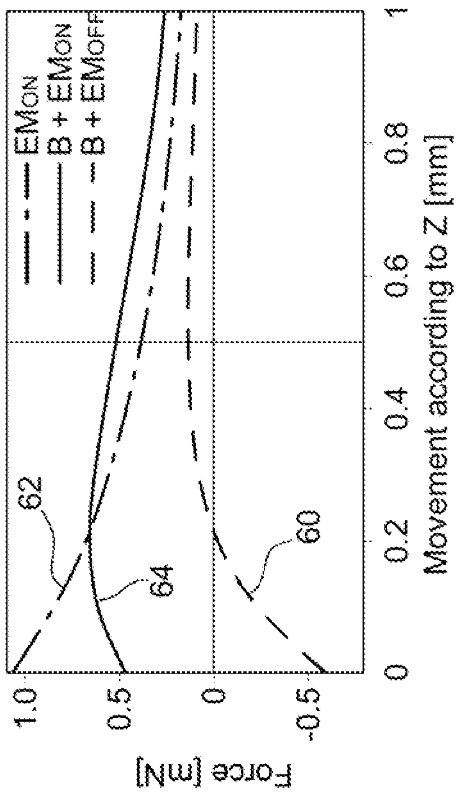
FIGS. 11A and 11B show curves of force according to a movement, according to an axis Z, of a magnetic element for stabilisation of the rest position of the flexible member, forming the electromechanical device of the third embodiment, for various forces acting in the electromechanical device of the third embodiment.

FIG. 11A gives the curve 60 of the magnetic force according to the movement of the magnetic element 54 from its position zero, corresponding to the rest position of the flexible member/the mechanical element and in which its lower surface is the same as the upper surface of the first magnet which defines this position zero, to the position of contact of the mechanical element 22 with the balance. It should be noted that the magnetic interaction between the two magnets is indicated by "B" in the legends of FIGS. 11A, 11B, 13A and 13B, whereas "EM" indicates the electromagnetic interaction between the coil and the first magnet 52, which is either activated ("ON") or deactivated ("OFF"). The inversion of the direction of the magnetic force is visible in the graph of FIG. 11A, the curve 60 intercepting the axis Z=0. It is noted that the intensity of the magnetic force is relatively strong for the rest position (Z=0), so that the second magnet correctly plays its role of stabilisation of the flexible member in the rest position, then it decreases rapidly to be equal to zero just above 0.2 mm. Then, after the passage through the value zero, the magnetic force is positive but its intensity remains relatively low. However, over the distance of movement provided (0.5 mm), the quantity of energy necessary to overcome the magnetic force is significantly less than that necessary in the two first embodiments. The inversion of the magnetic force during a movement of the mechanical element 22 between the rest position and the position of contact with the felloe 24 of the balance thus changes the dynamics of the movement of this mechanical element during an electric pulse provided to the coil 14, which engenders an electromagnetic force given by the curve 62. The total magnetic force (addition of the magnetic force and the electromagnetic force during an activation of the electromagnetic system 10C) is shown by the curve 64. It is observed in the example given that this total magnetic force varies relatively little over the distance of movement of the magnetic element.

Figure 11B:
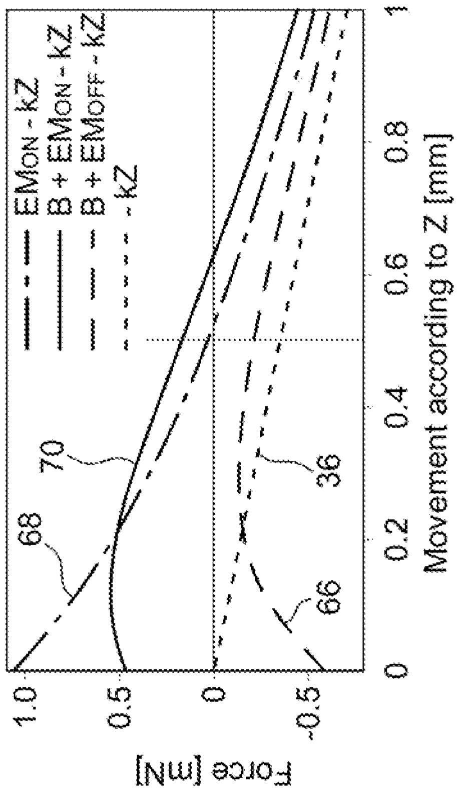

FIG. 11B shows various forces according to the movement of the magnetic element 54 while taking into consideration the mechanical force of the elastic element 20 forming the flexible member and the mechanical return force of which is given by the curve 36. The curve 66 gives a total return force equal to the sum of the magnetic force and of the mechanical force. The curve 68 corresponds to the sum of the electromagnetic force and of the mechanical return force. Finally, the curve 70 gives the curve of the overall force for all of the forces present, with the electromagnetic system supplied with power, according to the movement of the magnetic element, respectively of the mechanical element (with a small variation of scale according to the axis Z). It is observed that the various elements acting first of all in the total return force (curve 66) and then in the overall force (curve 70) are selected and arranged so that the overall force is positive over the entire distance of movement and the total return force is negative over the entire distance of movement, that is to say for any position between the rest position and the contact position. With regard to the latter condition, in other words, the first annular magnet, the second permanent magnet and the elastic element are configured and arranged in such a way that the sum of the mechanical return force and of the magnetic force has, over the entire distance that the mechanical element 22 can travel, a direction opposite to the direction of movement of this mechanical element from the rest position to the contact position, so as to form over this entire distance a total return force of the mechanical element towards the rest position.

Figure 12A:
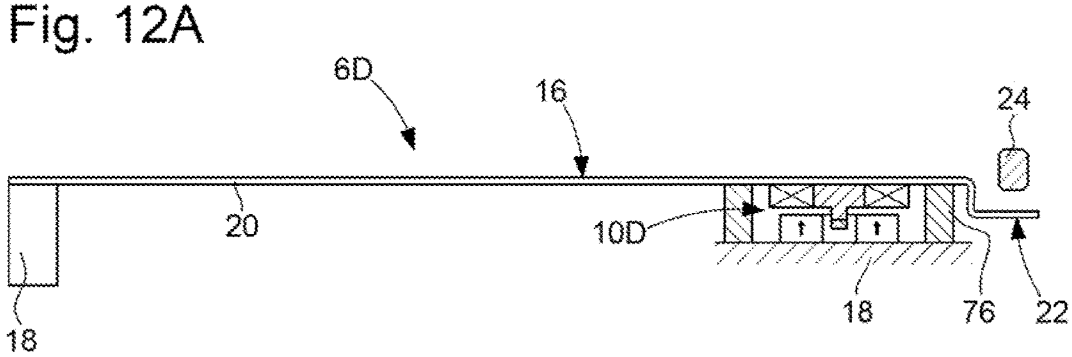
FIGS. 12A, 12B and 12C relate to a fourth embodiment of a watch according to the invention and are representations similar to those of FIGS. 9A to 9C.
Figure 12B:
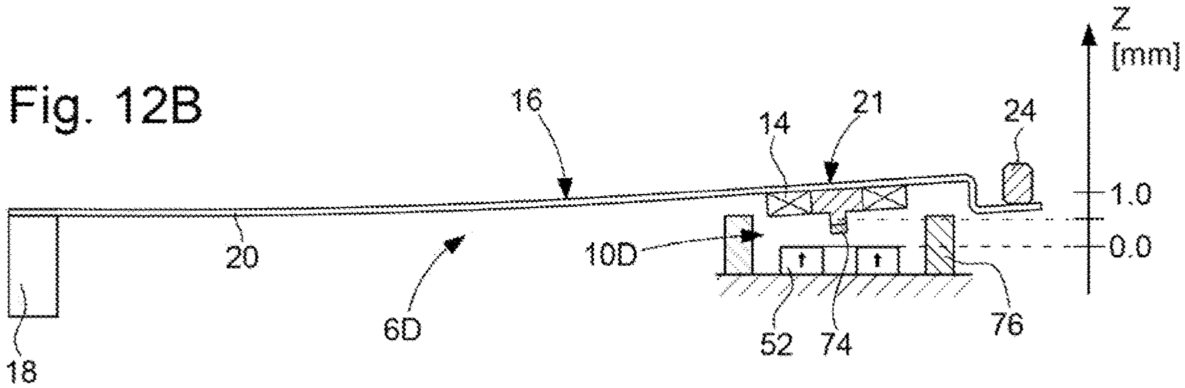
Figure 12C:
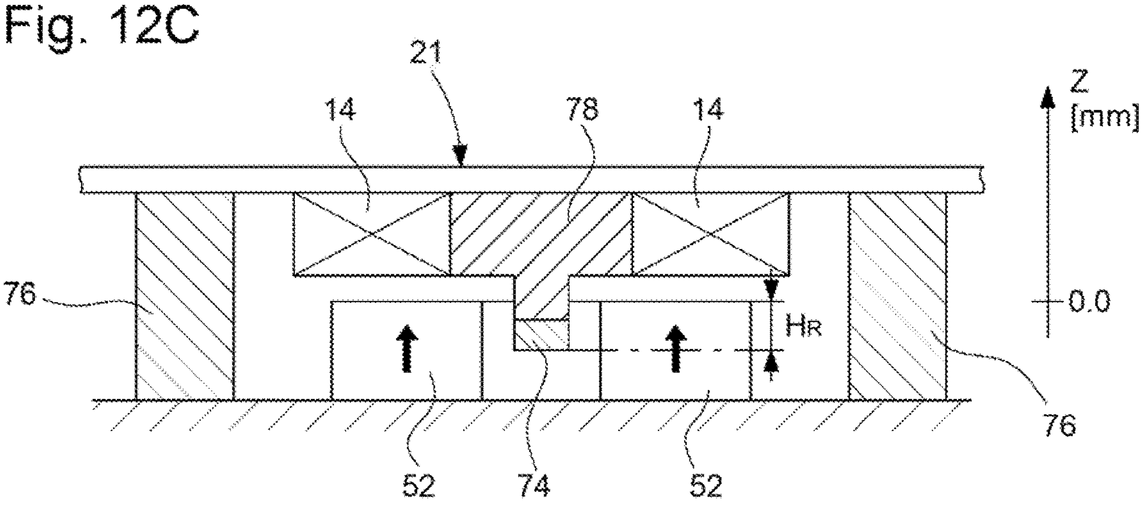

In reference to FIGS. 12A to 12C and to FIGS. 13A and 13B, finally a fourth embodiment of the invention will be described. The references already described in detail above will not be described again. This fourth embodiment substantially differs from the previous embodiment by the fact that the magnetic element 74 of the electromechanical device consists of a ferromagnetic material and that this ferromagnetic element 74 is positioned according to the axis Z at a different level. Moreover, in order to avoid impacts between the annular magnet 52 and the coil 14 during electric pulses successively provided to the coil to engender a plurality of braking pulses, a circular tube 76 is provided around the electromagnetic system 10D in the rest position. The cylindrical tube is arranged in such a way that the disc 21 of the flexible member bears against the upper surface of this cylindrical tube when the flexible member is at rest, the height of the cylindrical tube being selected so that the coil 14 is located at a distance from the permanent magnet 52 in the rest position of the flexible member.

The ferromagnetic element 74 has a solid, flat, round shape, in particular the shape of a disc, and it is arranged in such a way as to be aligned on a central axis of the annular permanent magnet when the mechanical element is in the rest position. The ferromagnetic element is fastened onto a protruding part of a support 78 forming a core of the coil 14. As visible in FIG. 12C, the ferromagnetic element is arranged inside the inner space of the annular permanent magnet when the flexible member is in its rest position and it thus has a negative offset $H_R$ relative to the second permanent magnet of the previous embodiment, that is to say that its lower surface is located below the position Z=0 which is defined, like in the third embodiment, by the level of the upper surface of the permanent magnet 52. In general, the ferromagnetic element is arranged in such a way as to be positioned at least partially in an inner space of the annular permanent magnet 52 when the mechanical element is in the rest position.

Figure 13A:
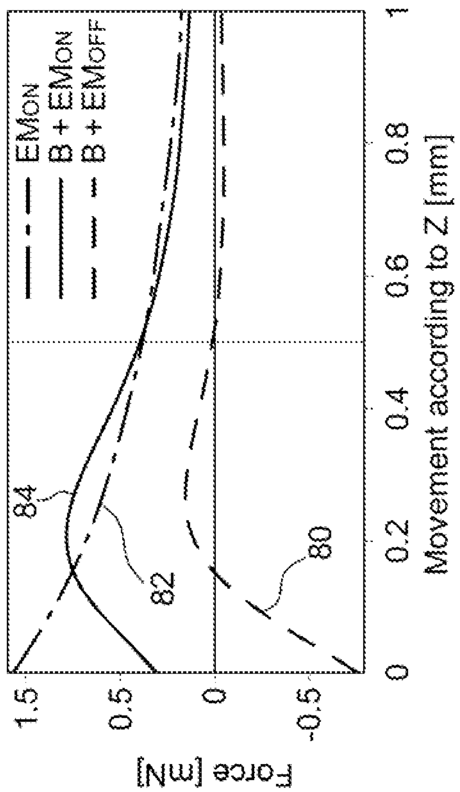
FIGS. 13A and 13B show curves of force according to a movement, according to an axis Z, of a magnetic element for stabilisation of the rest position of the flexible member, forming the electromechanical device of the fourth embodiment, for various forces acting in the electromechanical device of the third embodiment.
Figure 13B:
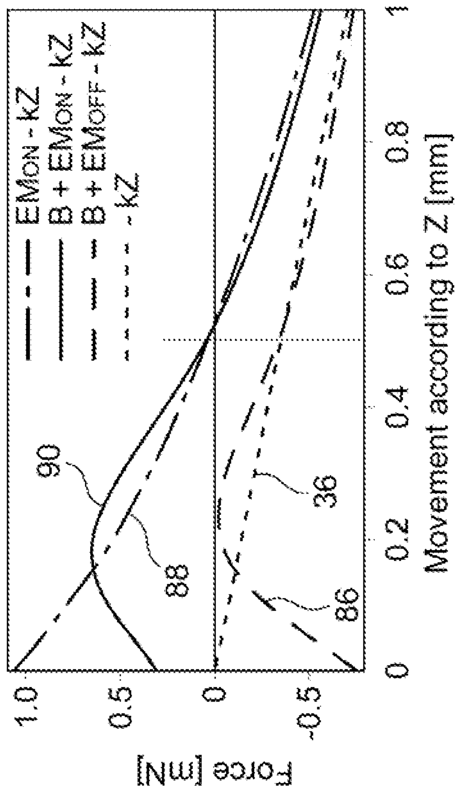

FIGS. 13A and 13B give two graphs with curves representing the same forces, according to the movement of the ferromagnetic element, as in the graphs of FIGS. 11A and 11B. The curve 80 relates to the magnetic force between the annular permanent magnet and the ferromagnetic element. It is observed that the positioning of the ferromagnetic element in the inner space of the annular permanent magnet, when the flexible member is at rest, allows to have a negative direction for the magnetic force, and thus a magnetic return force, over a first part of the distance that the ferromagnetic element, respectively the mechanical element, can travel from the rest position of the flexible member and an intensity of this magnetic force that is relatively significant when this flexible member is in its rest position (Z=0). The curve 82 of the electromagnetic force is identical to the curve 62. The curve 84 shows the total magnetic force (addition of the magnetic force and of the electromagnetic force during an activation of the electromagnetic system 10D). It is observed in the given example that this total magnetic force varies reasonably over the distance of movement of the magnetic element, but it remains positive and relatively significant over the entire distance between the rest position and the contact position (Z=0.5 mm).

FIG. 13B shows various forces according to the movement of the ferromagnetic element 74, while taking into consideration the mechanical force of the elastic element 20 forming the flexible member and the mechanical return force of which is given by the curve 36. The curve 86 gives a total return force equal to the sum of the magnetic force and of the mechanical force. The curve 88 corresponds to the sum of the electromagnetic force and of the mechanical return force. Finally, the curve 90 gives the curve of the overall force for all of the forces present, with the electromagnetic system 10D supplied with power, according to the movement of the ferromagnetic element, respectively of the mechanical element (with a small variation in scale according to the axis Z). It is observed that the various elements acting first of all in the total return force (curve 86) and then in the overall force (curve 90) are selected and arranged so that the overall force is positive over the entire distance of movement and the total return force is negative for any position of the ferromagnetic element between the rest position and the contact position of the mechanical element. In other words, according to the latter condition which relates to a preferred alternative, the annular permanent magnet 52, the ferromagnetic element 74 and the elastic element 20 are configured and arranged in such a way that the sum of the mechanical return force and of the magnetic force has, over the entire distance that the mechanical element 22 can travel, a direction opposite to the direction of movement of this mechanical element from the rest position to the contact position, so as to form over all of said distance of movement a total force of return of the mechanical element towards the rest position. It is noted that it is not necessary, although preferred, for the overall force to be positive until the contact position. Indeed, given the dynamics of the movement of the mechanical element, the latter arrives at the contact position with a certain kinetic energy so that an overall force slightly negative over a final part of said distance of movement does not pose a major problem. Finally, although preferred, it is not indispensable for the total return force to remain negative over all of said distance of movement, and for it to thus lose over a certain intermediate section its nature of return force. Indeed, after an impact between the mechanical element and the balance in the contact position, the mechanical element 22 travels back in the opposite direction towards the rest position with a certain energy. Moreover, if the total return force is significant over said final part of the distance of movement, then the mechanical element stores a certain kinetic energy that can allow it to cross a certain intermediate section in which the total return force momentarily changes direction.

The invention claimed is:

1. A timepiece, comprising:

an actuator including an electromechanical device, which comprises an electromagnetic system and a mechanical element that is mobile in translation and associated with the electromagnetic system, and an electric control circuit, the electromagnetic system being formed by a permanent magnet and a coil, one out of the two of which is carried by a flexible member of the electromechanical device and the other by a support of this flexible member, said mechanical element being formed by said flexible member and the actuator being arranged in such a way as to allow, in response to an electric activation signal generated by the electric control circuit and provided to the coil to engender an electromagnetic force between this coil and said permanent magnet, a movement of the mechanical element from a rest position, in which it is provided that the mechanical element remains in the absence of an activation of the electromagnetic system, to a position of contact with a determined part of the timepiece, wherein said flexible member is formed at least partially by an elastic element that is arranged to engender a mechanical force of return of the mechanical element in the direction of said rest position from said contact position for more than half the distance that the mechanical element travels from said contact position to said rest position, when the electric control circuit generates said electric activation signal, between the rest position and the contact position, this contact position ending said at least a majority of said distance, and wherein the actuator further comprises a magnetic element arranged to interact with said permanent magnet to engender therebetween a magnetic force that is exerted on the mechanical element when the mechanical element is in the rest position, the magnetic force having a direction opposite to that of said electromagnetic force over at least an initial part of said distance from the rest position and an intensity which decreases, over said at least an initial part, when the mechanical element moves away from the rest position and which is less than the intensity that said electromagnetic force has for any position of said mechanical element in said at least an initial part.

2. The timepiece according to claim 1, wherein said magnetic element includes a ferromagnetic material.

3. The timepiece according to claim 1, wherein said permanent magnet is a first magnet, wherein said magnetic element is formed by a second permanent magnet arranged in magnetic attraction with the first magnet when said mechanical element is in the rest position.

4. The timepiece according to claim 2, wherein said permanent magnet has a shape of a disc, and wherein said magnetic element is arranged in such a way as to be aligned on a central axis of the permanent magnet when the mechanical element is in the rest position.

5. The timepiece according to claim 2, wherein said permanent magnet has an annular shape.

6. The timepiece according to claim 3, wherein the first permanent magnet has a shape of a disc, and wherein said magnetic element is arranged in such a way as to be aligned on a central axis of the first permanent magnet when the mechanical element is in the rest position.

7. The timepiece according to claim 3, wherein the first permanent magnet has an annular shape.

8. The timepiece according to claim 4, wherein said ferromagnetic element has a shape of a disc.

9. The timepiece according to claim 6, wherein the second permanent magnet has a shape of a disc.

10. The timepiece according to claim 6, wherein said magnetic element includes the second permanent magnet, which has an annular shape defining a central circle, or a plurality of permanent magnets arranged along a geometric circle; wherein said central circle or said geometric circle has a diameter that is greater than the diameter of the first permanent magnet and is, when the flexible member is in the rest position, centred on the central axis of the first permanent magnet; and wherein the diameter of the central circle or of the geometric circle is selected so that said magnetic force between the first permanent magnet and the second permanent magnet, respectively the plurality of permanent magnets, has an inversion of direction during said movement of said mechanical element from the rest position to the contact position.

11. The timepiece according to claim 5, wherein said ferromagnetic element has a shape of a disc, and wherein the ferromagnetic element is arranged in such a way as to be aligned on a central axis of said permanent magnet when the mechanical element is in its rest position.

12. The timepiece according to claim 11, wherein the ferromagnetic element is arranged in such a way as to be positioned at least partially in an inner space of the annular permanent magnet when said mechanical element is in the rest position.

13. The timepiece according to claim 11, wherein the permanent magnet, the ferromagnetic element and the elastic element are configured and arranged in such a way that the sum of said mechanical return force and said magnetic force has, over all of said distance that said mechanical element can travel, a direction opposite to the direction of said movement of this mechanical element from the rest position to the contact position, so as to form over all of said distance a total force of return of the mechanical element towards the rest position.

14. The timepiece according to claim 7, wherein the second permanent magnet has a shape of a disc, and wherein the second permanent magnet is arranged in such a way as to be aligned on a central axis of the first permanent magnet when the mechanical element is in the rest position.

15. The timepiece according to claim 14, wherein the second permanent magnet is arranged so that said magnetic force between the first permanent magnet and the second permanent magnet has an inversion of direction during said movement of said mechanical element from the rest position to the contact position.

16. The timepiece according to claim 15, wherein the first permanent magnet, the second permanent magnet and the elastic element are configured and arranged in such a way that the sum of said mechanical return force and said magnetic force has, over all of said distance that said mechanical element can travel, a direction opposite to the direction of said movement of this mechanical element from the rest position to the contact position, so as to form over all of said distance a total force of return of the mechanical element towards the rest position.

* * * * *